POLYSTYRENE DISPERSION
|
ADD ACTIVE CARBON POWDER
|
ADD BLOWING AGENT
|
MIX COMPONENTS TO FORM SMOOTH PASTE
|
APPLY PASTE TO POROUS GRAPHITE BASE
|
DRY WITHOUT DECOMPOSING BLOWING AGENT
|
HEAT TO DECOMPOSE BLOWING AGENT
↓
GAS POROUS ELECTRODE

United States Patent Office 3,477,940
Patented Nov. 11, 1969

3,477,940
BINDER CONTAINING ELECTRODE FOR
ELECTROCHEMICAL PROCESSES
Donald H. Grangaard, Appleton, Wis., assignor to Kimberly-Clark Corporation, Neenah, Wis., a corporation of Delaware
Filed Dec. 27, 1966, Ser. No. 605,014
Int. Cl. B01k 3/08
U.S. Cl. 204—290                                    5 Claims

ABSTRACT OF THE DISCLOSURE

An electrode for use in alkaline electrolytes having a porous base and a porous coating of significant thickness adhered on the base such that the electrode is gas pervious to the extent required in the electrochemical reduction of oxygen. A process for preparing such an electrode by the inclusion of a blowing agent capable of evolving gas at a temperature at which the binder of the coating is at least in a plastic condition.

BACKGROUND OF THE INVENTION

Field of the invention

This invention relates to electrodes having utility in the electrochemical reduction of oxygen and to a process of preparing such electrodes.

Relationship of the prior art and the invention

Procedures for the preparation of oxygen containing compounds, such as hydrogen peroxide, through the electrochemical reduction of oxygen, are known. Such processes have been of limited utility, however, because of the difficulty of obtaining electrodes which are at the same time of suitable strength, electrical conductivity, porosity, efficiency, service life and cost to be of practical value. I have found that a satisfactory electrode for the purpose may be formulated by coating an electrical conducting porous substrate with the catalytic material required in the form of a coating in which the binder required to adhere the catalytic materials to the substrate is present in an amount previously found to be prohibitive from the standpoint of still maintaining the required porosity.

It is, accordingly, a primary object of this invention to provide a novel process for the production of an electrode suitable for use in electrochemical processes.

It is another object of this invention to provide a novel electrode structure of adequate electrical conductivity and good stability which exhibits in practice a long useful life while maintaining the desirable characteristics of porosity, resistance to wetting, good efficiency and the like.

SUMMARY OF DETAILS OF THE INVENTION

In more specific aspect, I have found that porous base materials such as graphite, sintered nickel and the like, may be beneficially provided with a catalytic coating of a gas porous material, through coating the base material with a solution which contains as the essential elements the catalytic material, a blowing agent and a satisfactory heat softenable, film forming resin binder, suspended and/or dissolved in a suitable solvent. The blowing agent is such as to be decomposable at or slightly above the softening point of the binder but decomposable well below the temperature at which the resin binder is adversely affected by heat.

The invention will be more fully understood by reference to the flow sheet in the single figure of the drawing and the following detailed example.

DESCRIPTION OF THE PREFERRED EMBODIMENT

As illustrated in the drawing, an electrode base material of porous graphite in thin sheet form of a thickness of about ¼″ to ½″ is coated by a solution made up as follows: 10 parts by weight of a polystyrene resin were dissolved in about 88 parts by weight of toluene. To this dispersion there is then added 6 parts by weight of activated carbon (mesh=100 to 325) and 6 parts by weight of a blowing agent, azodicarbonamide, available as a powder and having a decomposition temperature of about 350° F. This product is sold under the trade designation "Celogen AZ." The dispersion obtained is thoroughly agitated to completely mix the fine carbon particles with the blowing agent. The graphite base is then coated with the dispersion by either a brushing or spraying operation and the mass so obtained air dried. Such air drying takes place to an extent to substantially eliminate the toluene. The coated plate is then heated to about 350° F. for 30 minutes. This temperature is sufficient to provide the binder fluid and to decompose the blowing agent and, in so doing, provides the necessary porosity to the coating. The coating thickness on the base is commonly at least 0.020″ and up to about 0.035″.

An electrode prepared in this manner and having a coating of about 0.025″ thickness was mounted in a typical electrolytic cell and a voltage of 2 volts applied. The effective electrode area was 28 sq. in. The concentration of the alkaline solution of the cell used was 2%. In this particular cell arrangement 0.517 gram of peroxide per hour were formed at a power consumption of about 2.29 kwh./lb. peroxide.

This electrode structure demonstrated a very high degree of water resistance, much more than would have been expected by the inclusion of the binding agent alone. Quite possibly the blowing agent of organic nature, or the residue of the decomposition, has influenced this water resistance but positive proof for this is not presently available.

Successful electrodes also have been prepared in the described manner wherein the binder material was a polymethylmethacrylate resin.

Other blowing agents may be employed as, for example:
(a) p,p′-Oxybis-(benzenesulfonyl hydrazide) decomposition temperature about 310° F. and sold under the trade designation "Celogen."
(b) Dinitroso-pentamethylene-tetramine, decomposition temperature about 340° F., sold under the trade designation "Unicel ND."
(c) p,p′-Oxybis-(benzenesulfonyl semicarbazide) decomposition temperature 320° F.

These nitrogen liberating compounds and other useful blowing agents are characterized by giving off relatively large volumes of gas at temperatures at which the binders useful in this invention are in a plastic, fluid or semi-fluid condition.

Electrodes formulated as described in the example and with similar components as noted herein have the following important characteristics, namely;
(1) They exhibit good porosity;
(2) They have relatively good electrical conductivity;
(3) They show good efficiency;
(4) The catalytic active coating is well bonded to the substrate;
(5) They are relatively non-wetting;
(6) They are of relatively low cost; and
(7) They are easy to fabricate.

Particularly of interest and significance is that, although an extremely high binder to carbon ratio is used in order to provide the degree of adhesion required, no detrimental effect on the porosity and efficiency of the electrode appears to be obtained. Further, due to the higher binder contents, substantially thicker activated carbon coatings can be used without, in turn, appreciably affecting the porosity. This, in turn, results in a longer electrode life. As will be noted, on a dry basis the above formula contains an amount of binder greater than the weight of the carbon. Normally, this quantity of binder, if used without the blowing agent, would produce an almost completely non-porous electrode. Generally, the binder content may be within the ranges of about 80 to 160% of the weight of the finely divided carbon. This amount of binder is, by a factor of almost 5–10 times, higher than that shown by the prior art. Further, due to the relatively high proportion of binder, such electrodes are relatively non-wetting and, as a consequence, usually require no further wet proofing.

The quantity of blowing agent should generally be from about 30 to about 60% by weight based on the binder weight. Such will commonly result in a desired porosity for the purpose, one measure of such porosity being that the final electrode will pass from about 5 to 10 liters of gas per ft. squared per minute at an applied pressure of 1 to 2 lbs.

The success or failure of a particular resin for use as a binder appears to be highly dependent upon whether or not the resin is capable of being cast into a continuous film from a usual solvent system. If a continuous film cannot be cast, then such resins have been found to be unsatisfactory. For example, attempts to use resins of the polyethylene type have not been successful. The reason is that such resins apparently are not capable, under conventional conditions, of being cast into a continuous film from a solvent system. A further limitation to the type of resin used is that it must be stable to alkalies.

As many apparently widely different embodiments of this invention may be made without departing from the spirit and scope thereof, it is to be understood that I do not limit myself to the specific embodiments thereof except as defined in the appended claims.

What is claimed is:

1. An electrode comprising an electrically conductive porous base and a coating covering at least a portion of said base, said coating also being porous such that the combination of base and coating is gas pervious, said coating being alkali resistant and including a catalytically active component in particle form having a catalytically active surface and a film-forming binder adhering the said component particles together and to the base, the film-forming binder being present to the extent of between about 80% and 160% of the weight of the catalytically active component, said electrode being relatively non-wetting and having a substantial degree of water resistance.

2. An electrode according to claim 1 in which the catalytically active component is active carbon.

3. An electrode according to claim 1 in which the film-forming binder is present in greater proportion by weight than the component having the catalytically active surface.

4. An electrode according to claim 1 in which the porosity of the coating is the result of the decomposition of a nitrogen liberating organic blowing agent.

5. An electrode according to claim 1 in which the coating on the porous base has a thickness of between about 0.020" and 0.035".

References Cited

UNITED STATES PATENTS

| | | | |
|---|---|---|---|
| 2,275,281 | 3/1942 | Berl | 204—294 |
| 3,196,050 | 7/1965 | Thompson | 204—294 XR |
| 3,282,808 | 11/1966 | Kandler | 204—290 XR |
| 3,303,055 | 2/1967 | Gumucio. | |
| 3,321,286 | 5/1967 | Clark et al. | |
| 3,385,780 | 5/1968 | Feng | 204—294 |

FOREIGN PATENTS 589,953   12/1959   Canada.

JOHN H. MACK, Primary Examiner
D. R. JORDAN, Assistant Examiner

U.S. Cl. X.R.

117—226; 136—120; 204—294; 252—511